United States Patent [19]

Hatanaka et al.

[11] 4,108,833

[45] Aug. 22, 1978

[54] SILICONE RUBBER COMPOSITIONS

[75] Inventors: Masayuki Hatanaka, Gunma; Makoto Matsumoto, Ashikaga; Masaharu Yonezawa, Oota, all of Japan

[73] Assignee: Toshiba Silicone Co., Ltd., Tokyo, Japan

[21] Appl. No.: 743,234

[22] Filed: Nov. 18, 1976

[30] Foreign Application Priority Data

Dec. 24, 1975 [JP] Japan .............................. 50-155352

[51] Int. Cl.$^2$ .............................................. C08J 9/02
[52] U.S. Cl. ...................................... 528/31; 521/108; 260/37 SB; 521/15; 521/154; 260/825
[58] Field of Search .................... 260/2.5 S, 46.5 UA, 260/825

[56] References Cited

U.S. PATENT DOCUMENTS

| | | | |
|---|---|---|---|
| 3,188,300 | 6/1965 | Chalk | 260/46.5 UA |
| 3,419,593 | 12/1968 | Willing | 260/46.5 E |
| 3,923,705 | 12/1975 | Smith | 260/2.5 S |
| 3,936,581 | 2/1976 | Gorden | 260/46.5 UA |
| 4,024,091 | 5/1977 | Lee | 260/46.5 UA |
| 4,026,843 | 5/1977 | Kittle | 260/46.5 UA |
| 4,026,844 | 5/1977 | Kittle et al. | 260/46.5 UA |

FOREIGN PATENT DOCUMENTS 19,193 1967 Japan .............................. 260/46.5 UA

*Primary Examiner*—Morton Foelak
*Attorney, Agent, or Firm*—Blanchard, Flynn, Thiel, Boutell & Tanis

[57] ABSTRACT

Silicone rubber compositions comprising (A) a diorganopolysiloxane in which the organo substituents are 0.01 to 2 mole % vinyl groups, 0 to 10 mole % phenyl groups and the remainder is alkyl groups, (B) an organohydrogenpolysiloxane, (C) a (O) valent platinum-(III) phosphor complex and, optionally, (D) a filler. These compositions can be cured with steam. Foamable composition comprising (A), (B), (C) and hydrophobicized wet-process silica.

11 Claims, No Drawings

SILICONE RUBBER COMPOSITIONS

BACKGROUND OF THE INVENTION

1. FIELD OF THE INVENTION

This invention relates to silicone rubber compositions, and more particularly it relates to such silicone rubber compositions containing a (O) valent platinum-(III) phosphor complex which acts as a curing catalyst.

This invention also provides a method for curing said silicone rubbers, characterized particularly by the use of steam for effecting such curing.

This invention also provides silicone rubber foam compositions containing, as an inorganic filler, silica obtained from a hydrophobic treatment of a wet process silica.

2. DESCRIPTION OF THE PRIOR ART

There are known two general methods for curing a silicone rubber composition to form an elastomer, namely, a method using an organic peroxide and a method using a platinum compound. The present invention employs the latter method.

Curing of a silicone rubber composition in the presence of a platinum compound can be accomplished by subjecting an organopolysiloxane having olefin-type aliphatic unsaturated bonds and a polysiloxane having Si—H bonds to an addition reaction, according to the following reaction scheme:

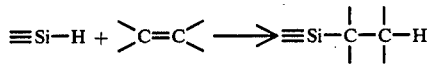

However, when chloroplatinic acid or platinum metal is used in such reaction, the reaction progresses even at a relatively low temperature range which is close to room temperature, so that, in most cases, the molecular weight of the silicone rubber composition increases, which causes an undesirable increase of the viscosity. Such increase of molecular weight and viscosity may sometimes change the state of the composition into a useless state before it can actually be put to practical use.

Various methods for controlling the reaction at or around room temperature have been proposed in order to overcome that problem. For instance, Japanese Patent Publication No. 31476/69 proposes the use of an inhibitor comprising an organic compound having acetylene bonds and also having at its α-position a functional group containing an element such as nitrogen, phosphor and sulfur. Also, in Japanese Patent Publication No. 19193/67, it is attempted to transform platinum into a divalent platinum-(III) phosphor complex and use it as a weak catalyst.

Use of the inhibitor disclosed in the above-mentioned Japanese Patent Publication No. 31476/69 has the theoretical advantage that a desired reaction rate can be selected by adjusting the quantity of the inhibitor added, but in practice, such quantitative adjustment is very difficult, and the addition of too much inhibitor may result in improper or imperfect curing. Further, there are cases in which the inhibitor becomes ineffective due to evaporation thereof, or the inhibitor even acts harmfully to the obtained silicone rubber. On the other hand, the weak catalyst used in said Japanese Pat. Pub. No. 19193/67, even though it makes it possible to provide a certain degree of retarding effect at room temperature, is still unsatisfactory for producing the desired effect. Such catalyst also has the disadvantage that it does not cause the curing to progress even if the composition is heated in a closed system. Another disadvantage of using such a catalyst is that the chlorine contained in the platinum compound causes an undesirable effect on the cured silicone rubber.

Generally, for accomplishing steam vulcanization of silicone rubbers, there are available (a) a method using an organic peroxide catalyst, and (b) a method using a platinum compound for the same purpose. According to the latter method, an organopolysiloxane having olefinic unsaturated bonds and an organopolysiloxane having Si—H bonds are reacted as follows in the presence of a platinum compound:

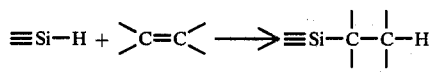

In such reaction, plain platinum metal or chloroplatinic acid is commonly used as the platinum compound employed as catalyst. However, the use of such platinum compound involves a serious problem. That is, if such a compound is used, the reaction can progress easily at a temperature close to room temperature whereby to cause an increase of the molecular weight of the composition, with the result being that the viscosity of the composition rises to such a high level that it can hardly be put to practical use. In addition, such compound may cause tackiness on the surfaces of the silicone rubber compositions after vulcanization.

There are known two general methods for obtaining foamed silicone rubbers, namely, a method in which a blowing agent is added to the silicone rubber composition (see Japanese Patent Publication No. 12675/70), and a method in which a low-boiling material by-produced from a condensation reaction of two polysiloxanes, such as represented by the following formula, is utilized (see Japanese Patent Publication Nos. 9297/58, 8755/69, and 9474/70, and Japanese Patent Application No. 119975/74).

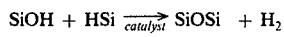

$$\text{SiOH} + \text{HSi} \xrightarrow{catalyst} \text{SiOSi} + H_2$$

According to the former method, an azo type blowing agent such as azobisisobutyronitrile, diazoaminobenzene, etc., an N-nitroso type blowing agent such as N,N'-dimethyldinitrosopentamethylenetetramine, or a benzenesulphonylhydrazide type blowing agent is used as an essential ingredient, and in order to obtain a uniform foamed product, it is imperative to properly select the quantity and kind of such a blowing agent used and to uniformly disperse such an agent in the composition. These blowing agents also have a disadvantageous aspect in that they may be decomposed to produce a toxic substance.

According to the latter method, if the number of functional groups in the siloxane that participate in the condensation reaction of the two polysiloxanes are few in the silicone rubber composition, the expansion rate may decrease to such an extent that it is no longer possible to produce the desired silicone rubber foams. This often occurs when using, for example, a polysiloxane having a high degree of polymerization.

SUMMARY OF THE INVENTION

This invention provides silicone rubber compositions which are free of the aforesaid disadvantages inherent in the conventional compositions and which possess high storage stability. More specifically, this invention relates to silicone rubber compositions comprising:

(A) 100 weight parts of a diorganopolysiloxane in which the organo groups are alkyl groups and vinyl groups and, optionally, phenyl groups, wherein the molar proportions of the respective groups, based on the total number of organo groups, are as follows: 0.01 to 2 mole % vinyl groups, zero to 10 mole % phenyl groups and the remainder, to 100 mole %, is alkyl groups. It is preferred that the alkyl groups are methyl. The average number of such organo groups is from 1.98 to 2.02, per one silicon atom;

(B) 0.1 to 10 weight parts of an organohydrogenpolysiloxane having at least two Si—H bonds in one molecule. It is preferred that the organo group is methyl;

(C) 0.0001 to 0.2 weight parts of a (O) valent platinum-(III) phosphor complex; and (D) zero to 200 weight parts of an organic filler. The ingredient (A) used in the present invention is a diorganopolysiloxane containing vinyl groups and having the following formula:

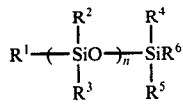

wherein $R^1$ to $R^6$, which can be the same or different, are alkyl having 1 to 18 carbon atoms, preferably 1 to 6 carbon atoms, vinyl or phenyl, and n is a number of 50 to 10,000 on an average. Such polysiloxane is commonly used for preparation of this type of silicone rubber, but in this invention, it is a critical requirement that the polysiloxane contains 0.01 to 2 mole % of vinyl groups bonded to the silicon atoms, and that at least two of such vinyl groups exist in one molecule. Such limitation on the use of vinyl groups is based on the fact that when the vinyl group content is less than 0.01 mole % satisfactory curing of the silicone rubber cannot be obtained, whereas if said vinyl group content is higher than 2 mole %, the heat resistance of the silicone rubber is insufficient.

Ingredient (B) used in this invention is an organohydrogenpolysiloxane having at least two Si-H bonds in one molecule. This polysiloxane is of the type which contains, as structural units thereof, $R^7HSiO$, $R^8R^9SiO$, $R^{10}R^{11}SiHO_{0.5}$, $R^{12}R^{13}R^{14}SiO_{0.5}$, $H_2SiO$, $HSiO_{1.5}$ and $SiO_2$ (wherein $R^7$ to $R^{14}$, which can be the same or different from each other, represent alkyl having 1 to 18 carbon atoms, preferably 1 to 6 carbon atoms, or phenyl and the average degree of polymerization is 6 to 5,000, preferably 10 to 500).

The amount of this organohydrogenpolysiloxane is in the range of from 0.1 to 10 weight parts per 100 weight parts of ingredient (A).

Ingredient (C) used in the present invention is a (O) valent platinum-(III) phosphor complex which acts as a catalyst for promoting curing of said organopolysiloxane ingredients (A) and (B) and it can be obtained by known methods such as those expressed by the following reaction schemes or a ligand exchange reaction carried out after these reactions:

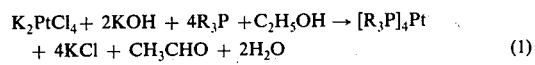

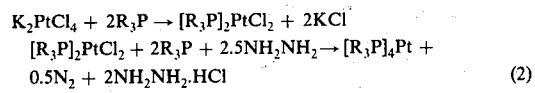

The (O) valent platinum-(III) phosphor complex (C) used in this invention has the formula: $[R_3^{15}P]_aPt$ wherein a is the number selected from 3 and 4 and $R^{15}$ is selected from halogenated and unsubstituted hydrocarbyl and hydrocarbyloxy groups having from 1 to 8 carbon atoms, which can be the same or different from each other. It is preferred that $R^{15}$ is unsubstituted alkyl and alkoxy having from 1 to 4 carbon atoms, phenyl, phenoxy, chlorophenyl or chlorophenoxy. The term of platinum-(III) phosphor includes platinum-phosphine, platinum-phosphite, platinum-phosphine-phosphite complex and platinum hydrocarbyloxy-phosphine complex. As examples of such complex, the following are enumerated: tetrakis(trimethylphosphine)-platinum $[(CH_3)_3P]_4Pt$, tetrakis(tributylphosphine)platinum $[(C_4H_9)_3P]_4Pt$, tetrakis(triphenylphosphine)platinum $[(C_6H_5)_3P]_4Pt$, tetrakis(trimethylphosphite)platinum $[(CH_3O)_3P]_4Pt$, tetrakis(tributylphosphite)platinum $[(C_4H_9O)_3P]_4Pt$, tetrakis(triphenylphosphite)platinum $[C_6H_5O)_3P]_4Pt$, tetrakis[tris(chlorophenyl)phosphite]platinum $[(ClC_6H_4O)_3P]_4Pt$, tetrakis[tris(p-chlorophenyl)phosphine]platinum $[(p-Cl\ C_6H_4)_3P]_4Pt$, bis[tris(p-chlorophenyl)phosphine]-bis(triphenylphosphite)platinum $[(p-Cl\ C_6H_4)_3P]_2-[(C_6H_5O)_3P]_2Pt$, tetrakis(diethylphenylphosphine)platinum $[(C_2H_5)_2(C_6H_5)P]_4Pt$, tetrakis(diethylphenylphosphite)platinum $[(C_2H_5O)_2(C_6H_5O)P]_4Pt$, tetrakis(dimethylbutoxyphosphine)platinum $[(CH_3)_2(C_4H_9O)P]_4Pt$, tris(triphenylphosphine)platinum $[(C_6H_5)_3P]_3Pt$, and tris(triphenylphosphite)platinum $[(C_6H_5O)_3P]_3Pt$. The amount of this platinum-(III) phosphor complex (C) is in the range of from 0.0001 to 0.2 weight parts, usually 0.001 to 0.1 weight part, per 100 weight parts of ingredient (A). If needed, such complex may be added in the form of a solution prepared by dissolving the complex in a suitable solvent.

The inorganic filler used as ingredient (D) in this invention can be of any known type which is conventionally used for preparation of this kind of silicone rubber. Preferred examples of such inorganic filler are finely divided silica, ground quartz, titanium oxide, alumina, iron oxide and carbon black, and such materials may be used either singly or in admixture. Such inorganic filler is blended in an amount of from 0 to 200 weight parts per 100 weight parts of ingredient (A).

In the present invention, it is also possible, if desired, to add a heat stabilizer such as iron octoate, a pigment and a process aid such as a low-molecular-weight siloxane (which is used when the viscosity of the composition is fairly high), in addition to the above-mentioned ingredients (A) to (D).

The silicone rubber compositions obtained according to this invention can be used for obtaining a wide variety of silicone rubbers. For example, they can be processed into potting silicone rubber or mold making silicone rubber because they are well cured even when heated in a closed system, or they can be used to obtain silicone rubbers for wires, tubes and tapes because said compositions can be cured in hot air.

It has been conventional that heat-curable silicone compositions have a value of "$n$" of 5,000 to 10,000, but this invention is characterized by having a value of n of 50 to 10,000.

It is also an important object of this invention to provide a method for obtaining silicone rubbers which have no tackiness on the surface when the silicone rubber compositions are subjected to steam vulcanization. The method according to this invention is characterized by a steam vulcanizing, a composition comprising:

(A) 100 weight parts of a diorganopolysiloxane in which the organo groups are alkyl groups and vinyl groups and, optionally, phenyl groups, wherein the molar proportions of the respective groups, based on the total number of organo groups, are as follows: 0.01 to 2 mole % vinyl groups, 0 to 10 mole % phenyl groups and the remainder, to 100 mole %, alkyl groups. It is preferred that the alkyl groups are methyl. The average number of such organo groups is from 1.98 to 2.02, per one silicon atom;

(B) 0.1 to 10 weight parts of an organohydrogenpolysiloxane having at least two Si-H bonds in one molecule. It is preferred that the organo groups are methyl;

(C) 0.0001 to 0.2 weight parts of a (O) valent platinum-(III) phosphor complex; and (D) 10 to 200 weight parts of an inorganic filler. The components (A) to (D) of this embodiment of the invention correspond to the components (A) to (D), respectively, of the previously described embodiment.

Ingredient (A) used for steam vulcanization according to this invention is preferably one in which $n$ is 1,000 to 10,000 on the average. It is preferred to use diorganopolysiloxanes in which vinyl groups are at both terminals of each molecule because such vinyl groups provide a slightly better physical property (especially, tear strength) than those in which the vinyl groups are positioned at side chains, but such is not an essential requirement of the invention.

The platinum complex (C) can be the same as described above. The amount of the platinum complex (C) is in the range of from 0.0001 to 0.2 weight parts, preferably 0.001 to 0.1 weight parts, per 100 weight parts of the ingredient (A). If needed, such complex can be added in the form of a solution prepared by dissolving the complex in a suitable solvent.

The amount of the ingredient (D) (an inorganic filler) in the silicone rubber composition used for steam vulcanization in this invention is preferably in the range of from 10 to 200 weight parts per 100 weight parts of said ingredient (A).

The silicone rubber compositions used for steam vulcanization in the method of this invention are excellent in storage stability in comparison with those made using other catalyst compounds such as chloroplatinic acid. Such compositions also have the advantage that they produce no tackiness on the product rubber surface as compared with those made using an organic peroxide or chloroplatinic acid as vulcanizing agent in steam vulcanization.

In the present invention, steam vulcanization is carried out under the conditions of a pressure of 2 to 20 kg/cm$^2$ and a temperature of 130° to 210° C, preferably 5 to 15 kg/cm$^2$ and 160° to 195° C.

The silicone rubber foam compositions according to this invention comprise:

(A) 100 weight parts of a diorganopolysiloxane having organic groups selected from methyl groups and vinyl groups and, optionally, phenyl groups, wherein the molar proportions of these groups, based on the total number of organo groups, are as follows: 0.01 to 2 mole % vinyl groups, 0 to 10 mole % phenyl groups and the remainder, to 100 mole %, is methyl groups. The average number of such organo groups is from 1.98 to 2.02 per one silicon atom;

(B) 0.1 to 100 weight parts of an organohydrogenpolysiloxane having at least two Si-H bonds in one molecule;

(C) 0.0001 to 0.2 weight parts of a platinum catalyst; and (D) 10 to 200 weight parts of silica obtained from hydrophobic treatment of wet-process silica.

Components (A) and (B) are the same as components (A) and (B) as described above.

Ingredient (A) used in the expandable silicone rubber compositions according to this invention is preferably one having alkyl groups, preferably methyl groups. This is true for the organo groups of ingredient (B), too.

The amount of ingredient (B) used in the preparation of the desired foam substance according to this invention is in the range of from 0.1 to 100 weight parts per 100 weight parts of ingredient (A). This is for the reason that the use of less than 0.1 weight part of organohydrogenpolysiloxane cannot produce satisfactory cured silicone rubbers, while if the amount is more than 100 weight parts, the desired heat resistance cannot be obtained in the obtained spongy silicone rubber and it is also uneconomical.

Ingredient (C) used in the silicone rubber foam compositions of this invention can be a platinum-type catalyst which is capable of promoting the reaction of ingredients (A) and (B). Examples of such catalysts include plain platinum metal, carbon-supported platinum, chloroplatinic acid, (II) valent platinum-olefin complex, (II) valent platinum-(III) phosphor complex such as (II) valent platinum-phosphine complex and (II) valent platinum-phosphite complex, and (O) valent platinum-(III) phosphor complex such as (O) valent platinum-phosphine complex and (O) valent platinum-phosphite complex. Examples of (II) or (O) valent platinum-(III) phosphor complexes are $[(C_4H_9)_3P]_2PtCl_2$, $[(C_6H_5O)_3P]_2PtCl_2$, $[(C_6H_5)_2(C_2H_5O)P]_2PtCl_2$, $[(C_6H_5)_3P]_4Pt$, and $[(C_2H_5O)_2(C_6H_5O)P]_4Pt$. (II) or (O) platinum-(III) phosphor complex includes the foregoing complexes in addition to phosphine-type and phosphite-type complexes. The (O) valent platinum-(III) phosphor complexes have the formula $[R_3^{16}P]_aPt$ as described above. The (II) valent platinum-(III) phosphor complexes have the formula $[R_3^{16}P]_2PtCl_2$, wherein $R^{16}$ has the same meaning as defined above.

The amount of such platinum-type catalyst is in the range of from 0.0001 to 0.2 weight parts. This is because of the fact that if the catalyst loading is less than 0.0001 weight part, no satisfactory cured silicone rubber is obtained, whereas if the loading is higher than 0.2 weight parts, an adverse effect on the heat resistance is imparted to the obtained silicone rubber foams and is also uneconomical.

It is preferred, according to this invention, to employ (O) valent platinum-(III) phosphor complexes in view of the improvement of storage stability of the uncured composition at room temperature and the heat stability of the obtained silicone rubber foam.

Ingredient (D) used in the silicone rubber foam compositions of this invention is silica of the type which is obtained from hydrophobic treatment of wet-process silica. Such silica is critical for obtaining the excellent silicone rubber foams according to this invention. Such silica is usually obtained by the following process:

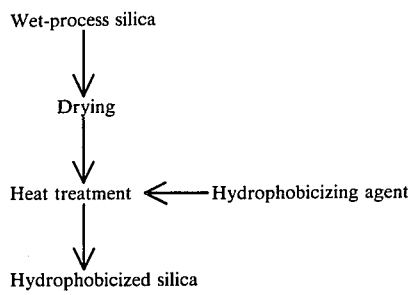

Wet-process silica
↓
Drying
↓
Heat treatment ← Hydrophobicizing agent
↓
Hydrophobicized silica To describe this more precisely, wet-process silica is first dried at 100° to 300° C under normal or reduced pressure for several hours to remove water adsorbed therein, and then a hydrophobicizing agent is added in an amount of 5 to 30 weight % based on the amount of silica, followed by a heat treatment at 100° to 400° C for several hours to obtain hydrophobicized silica. If any low-boiling matter exists, it is also removed in this process. "Wet-process silica" used here refers to silica obtained by decomposing sodium silicate or a silicon halide with an acid or alkali salt in water. Some examples of commercially available silicas are Hi-Sil, Nipsil and Santocel. The hydrophobicizing agent used may be any one of the types which are commonly used for hydrophobicizing this type of silica. Examples of such hydrophobicizing agents are silanes or silazanes such as $R^{16}R^{17}SiCl_2$, $R^{18}R^{19}R^{20}SiCl$ and $(R^{21}R^{22}R^{23}Si)_2NH$, or linear or cyclic diorganopolysiloxanes consisting of $R^{24}R^{25}SiO$ units, where $R^{16}$ to $R^{25}$ are methyl, phenyl or vinyl groups.

The amount of such hydrophobicized silica is in the range of from 10 to 200 weight parts, per 100 weight parts of ingredient (A).

In addition to these essential ingredients, it is also possible to add in the composition a pigment or a dispersant such as low-molecular-weight siloxane (which is used when the composition viscosity is fairly high).

The silicone rubber foam compositions obtained according to the present invention can provide very excellent silicone rubber foams when processed by hot-air vulcanization, and such rubbers can be used widely as packings or seals for various kinds of articles, structures, etc., where heat resistance, cold resistance and/or weather resistance are required.

Now the present invention is described in further detail by reference to the following illustrative examples thereof. In the following examples, all "parts" are by weight unless otherwise noted.

EXAMPLE 1

100 parts of trimethylsilyl-terminated methylvinylpolysiloxane consisting of 99.8 mole % of dimethylsiloxy units and 0.2 mole % of methylvinyl siloxy units and having a degree of polymerization of approximately 5,000, 40 parts of fumed silica and 2 parts of methylphenylpolysiloxanediol (viscosity: 50 centistokes) acting as a process aid were mixed well in a dough mixer. To this mixture were added 0.5 parts of trimethylsilyl-terminated methylhydrogenpolysiloxane with a degree of polymerization of 30 and 0.01 part of $[(C_6H_5)_3P]_4Pt$. The mixture was made into a 2 mm thick sheet. This sheet was cured in a 300° C hot-air oven for 2 minutes to obtain a silicone rubber possessing good elasticity. The properties of the thus-obtained silicone rubber and those of silicone rubbers obtained by using conventional catalysts by way of comparison are shown in Table 1.

In order to determine the stability of this composition at room temperature (15° to 30° C), it was allowed to stand at room temperature for 24 hours and the degree of the change of the plasticity thereof was examined. As a result, it was found that the compositions of Comparative Examples 1 and 2 underwent an excessive change of plasticity whereas the composition of this invention showed only a limited degree of change which was substantially equal to that of the composition of Comparative Example 3.

When the composition of this invention, which had been allowed to stand at room temperature for 24 hours, was cured at 300° C for 2 minutes, there was obtained a silicone rubber possessing as high an elasticity as before the treatment.

In order to examine the heat resistance in a sealed condition, the silicone rubber obtained from the composition of this invention was heated in an autoclave at 200° C for 24 hours. The results showed the excellent properties required of commercial silicone rubber as shown in Table 1. In contrast, the compositions of Comparative Examples 1, 2 and 3 were all excessively deteriorated and could not provide commercially acceptable silicone rubbers.

Table 1

|  | This invention | Comparative Example 1 *1 | Comparative Example 2 *2 | Comparative Example 3 *3 |
|---|---|---|---|---|
| Polysiloxane containing vinyl groups | 100 parts | 100 parts | 100 parts | 100 parts |
| Methylhydrogenpolysiloxane | 0.5 " | 0.5 " | 0.5 " | zero |
| Fumed silica | 40 " | 40 " | 40 " | 40 " |
| Curing catalyst | 0.01 " | 0.01 " | 0.01 " | 1.2 " |
| Plasticity (measured by William's plastometer) |  |  |  |  |
| Initial | 280 | 270 | 270 | 270 |
| 24 hrs. later | 330 | 510 | 450 | 300 |
| Hot-air curing (300° C, 2 min.) | No foaming | No foaming | No foaming | No foaming |
| Cured immediately after compounding |  |  |  |  |
| Hardness (JIS) | 58 | 55 | 55 | 55 |
| Tensile strength (kg/cm²) | 90 | 87 | 88 | 90 |
| Elongation (%) | 680 | 750 | 550 | 520 |
| Cured after 24 hrs. |  |  |  |  |
| Hardness (JIS) | 55 | — *4 | — *4 | 55 |
| Tensile strength (kg/cm²) | 86 | — *4 | — *4 | 90 |
| Elongation (%) | 710 | — *4 | — *4 | 500 |
| Heated at 200° C for 24 hrs. (in autoclave) |  |  |  |  |
| Hardness (JIS) | 62 | 56 | 55 | 49 |
| Tensile strength (kg/cm²) | 58 | Too weak to measure | Too weak to measure | Too weak to measure |

Table 1-continued

|  | This invention | Comparative Example 1 *1 | Comparative Example 2 *2 | Comparative Example 3 *3 |
| --- | --- | --- | --- | --- |
| Elongation (%) | 370 | Too weak to measure | Too weak to measure | Too weak to measure |

(Notes)
*1 Silicone rubber composition using chloroplatinic acid as curing catalyst.
*2 Silicone rubber composition using [(C₆H₅)₃P]₂PdCl₂ as curing catalyst.
*3 Silicone rubber composition using 2,4-dichlorobenzoyl peroxide as curing catalyst (catalyst was added in the form of 50% silicone paste of said substance).
*4 Unmeasurable because the composition could not be plasticized.

EXAMPLE 2

A silicone rubber composition was prepared by using the same ingredients in the same amounts as described in Example 1 except for the use of 0.01 part of $[(CH_3O)_3P]_4Pt$ in place of $[(C_6H_5)_3P]_4Pt$, and this composition was cured in a hot-air oven at 300° C for 2 minutes. An excellent silicone rubber was obtained. For determining the storage stability as measured by the change of plasticity, the composition was allowed to stand at room temperature for 3 days, but is underwent only little change and maintained good working properties. When this composition was further cured at 300° C for 2 minutes, there was obtained a silicone rubber with as high an elasticity as in the initial state. The properties of the obtained silicone rubber are shown in Table 2.

EXAMPLE 3

A silicone rubber composition was prepared by using the same process as described in Example 1 except for using 0.01 part of $[(C_6H_5O)_3P]_4Pt$ in place of $[(C_6H_5)_3P]_4Pt$. This composition was cured in the same way as the preceding example. The same result as Example 1 is obtained. The properties of the thus obtained silicone rubber are shown in Table 2.

Table 2

|  | Example 2 | Example 3 |
| --- | --- | --- |
| Plasticity (measured by William's plastometer) | | |
| Initial | 290 | 280 |
| 3 days later | 330 | 350 |
| Hot-air curing (300° C, 2 min.) | No foaming | No foaming |
| Cured immediately after incorporation | | |
| Hardness (JIS) | 57 | 58 |
| Tensile strength (kg/cm²) | 80 | 73 |
| Elongation (%) | 590 | 580 |
| Cured after 3-day standing | | |
| Hardness (JIS) | 58 | 59 |
| Tensile strength (kg/cm²) | 77 | 79 |
| Elongation (%) | 630 | 590 |
| Heated at 200° C for 24 hrs. (in autoclave) | | |
| Hardness (JIS) | 64 | 64 |
| tensile strength (kg/cm²) | 55 | 59 |
| Elongation (%) | 340 | 340 |

EXAMPLE 4

Silicone rubber was obtained using the same ingredients and the same method as described in Example 1 except for using trimethylsilyl-terminated diorganopolysiloxane consisting of 94.8 mole % of dimethylsiloxy units, 0.2 mole % of methylvinylsiloxy units and 5 mole % of diphenylsiloxy units and having a degree of polymerization of approximately 6,000. Tests of the properties of the obtained silicone rubber gave substantially the same results as described in Example 1.

EXAMPLE 5

100 parts of methylvinylpolysiloxane consisting of 99 mole % of dimethylsiloxy units and 1 mole % of methylvinylsiloxy units and having a degree of polymerization of approximately 200, 80 parts of ground quartz and 5 parts of methylhydrogenpolysiloxane consisting of 67 mole % of dimethylhydrogensiloxy units and 33 mole % of $SiO_2$ units having 40 Si atoms in one molecule were mixed well, to this mixture was further added 0.01 part of $[(C_6H_5O)_3P]_4Pt$ and the composition was mixed well until the mixture became homogeneous. The resultant composition was divided into two portions. One portion was immediately heated at 150° C for 10 minutes. It was well cured and produced a silicone rubber having a hardness of 70 (according to JIS rating). Another portion of the composition was allowed to stand at room temperature for one week, and the increase of its viscosity was measured. No change of viscosity was seen after standing. This portion of the composition, after standing, was further heated at 150° C for 10 minutes, and the obtained silicone rubber was compared with the initially obtained silicone rubber. There was found no difference at all between them.

EXAMPLE 6

100 parts of methylvinylpolysiloxane with 99.9 mole % of dimethylsiloxy units and 0.1 mole % of methylvinylsiloxy units and a degree of polymerization of approximately 2,000, and 5 parts of methylhydrogenpolysiloxane with 67 mole % of dimethylhydrogensiloxy units and 33 mole % of $SiO_2$ units having 40 Si atoms in one molecule were mixed well, and then there was added 0.01 part of $[(C_4H_9O)_3P]_4Pt$. The resultant composition was divided into two portions. One portion was cast into a mold made of stainless steel so that the entire space in the mold was filled up with this composition, and after closing the casting port, the composition was heated at 150° C for 10 minutes, thereby obtaining excellently cured silicone rubber. The other portion of the composition was allowed to stand at room temperature for one week, and the increase of its viscosity was examined. The result showed no change of viscosity at all between "before" and "after" standing. This portion of the composition after standing was further heated at 150° C for 10 minutes in the previously used mold, and the obtained silicone rubber was compared with the initially obtained silicone rubber. No difference at all was found between them.

EXAMPLE 7

100 parts of methyldodecylvinylpolysiloxane consisting of 65 mole % of dimethylsiloxy units, 33 mole % of methyldodecylsiloxy units and 2 mole % of methylvinylsiloxy units and having a polymerization degree of approximately 200, and 10 parts of methylhydrogenpolysiloxane consisting of 60 mole % of dimethylsiloxy units, 38 mole % of methylhydrogensiloxy units and 2 mole % of dimethylhydrogensiloxy units and having a polymerization degree of approximately 100 were mixed well, and to this mixture was further added 0.1 part of $[(CH_3)_2-(C_4H_9O)P]_4Pt$. The mixture was heated at 180° C for 10 minutes. An excellently cured silicone rubber was obtained.

EXAMPLE 8

100 parts of dimethylvinylsilyl-terminated polyorganosiloxane with a polymerization degree of approximately 6,000, consisting of 99.8 mole % of dimethylsiloxy units and 0.2 mole % of methylvinylsiloxy units, 43 parts of fumed silica, and 2 parts of methylphenylpolysiloxanediol (with viscosity of 50 centistokes at 25° C) serving as process aid were mixed well, and to this mixture was further added 0.5 parts of trimethylsilyl-terminated methylhydrogenpolysiloxane with a polymerization degree of 30 and 0.01 part of $[(C_6H_5)_3P]_4Pt$. This mixture was made into a 2 mm-thick rubber sheet. This sheet was cured in steam at 160° C for 40 minutes, thereby obtaining a silicone rubber with a high elasticity. The properties of the thus-obtained silicone rubber and those of silicone rubbers obtained by using the conventional catalysts by way of comparison are shown in Table 3.

When the rubber sheet, not subjected to steam curing, was allowed to stand at room temperature for 24 hours and then cured in steam at 5 kg/cm$^2$ and 160° C for 40 minutes, there was obtained a silicone rubber with as excellent an elasticity as the initially obtained one.

shown in Table 4 along with those of silicone rubber obtained in Example 10 which follows.

EXAMPLE 10

A silicone rubber composition was prepared by using the same ingredients and same amounts as described in Example 8 except for using 0.01 part of $[(C_6H_5O)_3P]_4Pt$ in place of $[(C_6H_5)_3P]_4Pt$, and this composition was cured in the same way as Example 8, thereby obtaining an excellent silicone rubber with no surface tackiness. The properties of this silicone rubber are shown in Table 4 below.

Table 4

|  | Example 9 | Example 10 |
|---|---|---|
| Plasticity (William's plastometer) |  |  |
| Initial | 280 | 285 |
| 4 days later | 350 | 330 |
| Surface of cured Sample | No tackiness | No tackiness |
| Cured immediately after compounding |  |  |
| Hardness (JIS) | 59 | 60 |
| Tensile strength (kg/cm$^2$) | 88 | 90 |
| Elongation (%) | 620 | 600 |
| Cured after 4-day standing |  |  |
| Hardness (JIS) | 58 | 60 |
| Tensile strength (kg/cm$^2$) | 85 | 91 |
| Elongation (%) | 630 | 590 |

EXAMPLE 11

Table 3

|  | Example 8 | Comparative Example 4 *1 | Comparative Example 5 *2 | Comparative Example 6 *3 |
|---|---|---|---|---|
| Polysiloxane containing vinyl groups | 100 parts | 100 parts | 100 parts | 100 parts |
| Methylhydrogenpolysiloxane | 0.5 " | 0.5 " | zero | zero |
| Fumed silica | 43 " | 43 " | 43 " | 43 " |
| Curing catalyst | 0.01 " | 0.01 " | 1.2 " | 4.0 " |
| Plasticity (measured by Williams's plastometer) |  |  |  |  |
| Initial | 290 | 280 | 280 | 280 |
| 24 hrs. later | 335 | 520 | 320 | 320 |
| Surface of cured sample | No tackiness | — | Tacky | Tacky |
| Cured immediately after compounding |  |  |  |  |
| Hardness (JIS) | 58 | 56 | 56 | 55 |
| Tensile strength (kg/cm$^2$) | 91 | 88 | 90 | 90 |
| Elongation (%) | 650 | 700 | 530 | 580 |
| Cured after 24 hours |  |  |  |  |
| Hardness (JIS) | 56 | — *4 | 56 | 52 |
| Tensile strength (kg/cm$^2$) | 86 | — *4 | 92 | 88 |
| Elongation (%) | 690 | — *4 | 520 | 550 |

(Notes)
*1 Silicone rubber composition prepared by using chloroplatinic acid as curing catalyst.
*2 Silicone rubber composition prepared by using 2,4-dichlorobenzoylperoxide as curing catalyst. (Catalyst was added in the form of 50% silicone paste of 2,4-dichlorobenzoylperoxide).
3* Silicone rubber composition prepared by using di-tertiary-butylperoxide as curing catalyst. (Catalyst was added in the form of 50% silicone paste of di-tertiary-butylperoxide).
*4 Unmeasurable because the composition could not be plasticized.

EXAMPLE 9

A silicone rubber composition was prepared by using the same ingredients, in the same amounts, as described in Example 8 except for using 0.01 part of $[(CH_3O)_3P]_4Pt$ instead of $[(C_6H_5)_3P]_4Pt$. This composition was cured in steam at 6 kg/cm$^2$ and 165° C for 30 minutes, thereby obtaining an excellent silicone rubber which has no surface tackiness. For examining the storage stability, as measured by the change of its plasticity, of uncured silicone rubber composition, it was allowed to stand at room temperature for 4 days. The result showed only little change and it retained its properties to a satisfactory degree. Then, this composition was cured in steam at 6 kg/cm$^2$ and 165° C for 30 minutes, whereby there was obtained a silicone rubber with as excellent an elasticity as the initially obtained one. The properties of the thus-obtained silicone rubber are A silicone rubber composition was prepared by using the same ingredients and same method as described in Example 8 except for using trimethylsilyl-terminated polydiorganosiloxane consisting of 94.8 mole % of dimethylsiloxy units, 0.2 mole % of methylvinylsiloxy units and 5 mole % of diphenylsiloxy units and having a polymerization degree of approximately 6,000, and this silicone rubber composition was cured in steam at 10 kg/cm$^2$ and 183° C for 30 minutes. There was obtained an excellent silicone rubber with no surface tackiness.

EXAMPLE 12

100 parts of trimethylsilyl-terminated polydiorganosiloxane consisting of 92.8 mole % of dimethylsiloxy units, 0.2 mole % of methylvinylsiloxy units and 7 mole % of methylphenylsiloxy units and having a polymerization degree of approximately 7,000, 50 parts of fumed silica and 4 parts of dimethylmethoxysilyl-terminated methylphenylpolysiloxane (with a viscosity of 60 centistokes at 25° C) acting as a process aid were uniformly mixed by a dough mixer. This mixture was further mixed with 0.5 part of methylhydrogenpolysiloxane consisting of 67 mole % of $(CH_3)_2HSiO_{0.5}$ units and 44 mole % of $SiO_2$ units and 0.01 part of $[(C_6H_5)_3P]_4Pt$, and the obtained mixture was extruded by using an extruder to form an unvulcanized rubber hose, which was then cured in steam at 15 kg/cm² and 195° C for 30 minutes. The thus formed rubber hose had excellent elasticity and no surface tackiness.

EXAMPLE 13

A silicone rubber composition was prepared by using the same ingredients and same amounts as described in Example 12 except for using 0.01 part of $[(CH_3)_2(C_4H_9O)P]_4Pt$ in place of $[(C_6H_5)_3P]_4Pt$, and this composition was molded and cured under the same conditions as described in Example 12, thereby obtaining a silicone rubber hose as excellent as the one obtained in Example 12.

EXAMPLES 14 – 16 AND COMPARATIVE EXAMPLES 7 AND 8

Method of preparation of silicas used:

Silica I ... 100 parts of wet-process silica was hydrophobicized with 20 parts of $[(CH_3)_2SiO]_4$.

Silica II ... 100 parts of wet-process silica was hydrophobicized with 15 parts of $[(CH_3)_3Si]_2NH$.

Silica III ... 100 parts of wet-process silica was hydrophobicized with 15 parts of polydimethylsiloxane with polymerization degree of approximately 50 and 5 parts of $[(CH_3)_2SiO]_4$.

Silica IV ... 100 parts of fumed silica was hydrophobicized with 20 parts of $[(CH_3)_2SiO]_4$.

Silica V ... Non-hydrophobicized wet-process silica.

100 parts of trimethylsilyl-terminated vinylmethylpolysiloxane consisting of 99.8 mole % of dimethylsiloxy units and 0.2 mole % of methylvinylsiloxy units and having a polymerization degree of approximately 5,000 was mixed with each of said silicas I to V, trimethylsilyl-terminated methylhydrogenpolysiloxane with a polymerization degree of approximately 30 and $[(C_6H_5O)_3P]_4Pt$ in the amounts shown in Table 5 to prepare five different specimen compositions. Each of these specimens was cut into a predetermined size and allowed to stand at room temperature for 3 days, but no hardening took place in each specimen. However, when they were heated in a hot-air oven at 300° C for 5 minutes, the compositions of this invention were transformed into excellent silicone rubber foams with a volumetric expansion rate of 400 to 500%, whereas the composition of Comparative Example 7 using a hydrophobicized fumed silica did not foam. In the case of the composition of Comparative Example 8 wherein non-hydrophobicized wet-process silica was used, although it produced foams, the obtained silicone rubber was heterogeneous in structure and not in a desired sponge-like foam.

Table 5

| | Example 14 | Example 15 | Example 16 | Comparative Example 7 | Comparative Example 8 |
|---|---|---|---|---|---|
| Polysiloxane containing vinyl groups | 100 parts | 100 parts | 100 parts | 100 parts | 100 parts |
| Methylhydrogenpolysiloxane | 0.5 " | 0.5 " | 0.5 " | 0.5 " | 0.5 " |
| Silica | I, 50 " | II, 50 " | III, 50 " | IV, 50 " | V, 50 " |
| $[(C_6H_5O)_3P]_4Pt$ | 0.01 " | 0.01 " | 0.01 " | 0.01 " | 0.01 " |
| Expanding rate *1 (%) | 400 | 480 | 470 | No foaming | Non-uniform foaming |

(Note)
*1 Determined on the basis of volumetric change as observed when heating each composition at 300° C for 5 minutes.

EXAMPLE 17

A silicone rubber composition was prepared by following the same procedure as described in Example 16 except for using an isopropanol solution containing 0.01 part of chloroplatinic acid instead of $[(C_6H_5O)_3P]_4Pt$, and this composition was heated in a hot-air oven at 300° C for 2 minutes, whereby there was obtained an excellent spongy silicone rubber with a volumetric foaming rate of 350%.

EXAMPLE 18

A silicone rubber composition was prepared by using the same process as described in Example 16 except for using 0.01 part of $[(C_6H_5)_3P]_2PtCl_2$ as platinum catalyst, and this composition was heated in a 300° C hot-air oven for 2 minutes, thereby obtaining an excellent spongy silicone rubber with a volumetric foaming rate of 400%.

EXAMPLE 19

The process of Example 15 was followed but by using 70 parts of silica prepared by hydrophobicizing wet-process silica with $[(CH_3)_3Si]_2NH$ to obtain a silicone rubber composition, and this composition was heated in a 300° C hot-air oven for 5 minutes, thereby obtaining an excellent silicone rubber foam with a volumetric expanding rate of 400%.

EXAMPLE 20

100 parts of trimethylsiloxy-terminated diorganopolysiloxane consisting of 94.8 mole % of dimethylsiloxy units, 0.2 mole % of methylvinylsiloxy units and 5 mole % of diphenylsiloxy units and having a polymerization degree of approximately 6,000 was mixed well with 40 parts of the silica used in Example 16 and 1 part of methylhydrogenpolysiloxane consisting of 67 mole % of methylhydrogensiloxy units and 33 mole % of $SiO_2$ units. This mixture was further mixed with 0.01 part of $[(C_6H_5)_3P]_4Pt$, and the resultant composition was heated in a 300° C hot-air oven for 5 minutes, thereby obtaining an excellent silicone rubber foam with a volumetric expanding rate of 330%.

EXAMPLE 21

100 parts of trimethylsilyl-terminated vinylmethylpolysiloxane consisting of 99.9 mole % of dimethylsiloxy units and 0.1 mole % of methylvinylsiloxy units and having a polymerization degree of approximately 5,000, 120 parts of the silica used in Example 16, and 80 parts of trimethylsiloxy-terminated methylhydrogenpolysiloxane consisting of 1 mole % of methylhydrogensiloxy units and 99 mole % of dimethylsiloxy units and having a polymerization degree of approximately 3,000 were mixed well, followed by further addition of 0.01 part of [(C₄H₉O)₃P]₄Pt, and this mixture was heated in a hot-air oven at 300° C for 5 minutes, thereby obtaining an excellent silicone rubber foam with a volumetric expanding rate of 400%.

EXAMPLE 22

100 parts of methylvinylpolysiloxane consisting of 99 mole % of dimethylsiloxy units and 1 mole % of methylvinylsiloxy units and having a polymerization degree of approximately 200, 30 parts of the silica used in Example 15, and 5 parts of methylhydrodienepolysiloxane consisting of 67 mole % of methylhydrodienesiloxy units and 33 mole % of SiO₂ units were mixed well, and after further adding 0.01 part of [(C₆H₅O)₃P]₂PtCl₂, the mixture was heated at 150° C for 15 minutes, thereby obtaining an excellent spongy silicone rubber with a volumetric foaming rate of 250%.

The embodiments of the invention in which an exclusive property or privilege is claimed are defined as follows:

1. A silicone rubber composition consisting essentially of
    (A) 100 parts by weight of diorganopolysiloxane having the formula

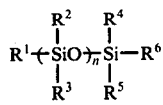

wherein $R^1$, $R^2$, $R^3$, $R^4$, $R^5$ and $R^6$, which can be the same or different, are organo groups selected from the group consisting of alkyl, vinyl and phenyl, with the provisos that from 0.01 to 2.0 mole percent thereof are vinyl and there are at least two vinyl groups in the molecule, from zero to 10 mole percent thereof are phenyl, and the remainder thereof are alkyl, the average number of $R^1$ to $R^6$ groups being from 1.98 to 2.02, per one silicon atom, and n is a number from 50 to 10000 on the average,
    (B) from 0.1 to 10 parts by weight of organohydrogenpolysiloxane having at least two Si-H bonds in the molecule, and the average degree of polymerization is from 6 to 5,000,
    (C) from 0.0001 to 0.2 parts by weight of (O) valent platinum-(III) phosphor complex, and
    (D) from zero to 200 parts by weight of inorganic filler.

2. A silicone rubber composition as claimed in claim 1 in which said alkyl groups of component (A) and the organo group of component (B) are methyl groups.

3. A silicone rubber composition as claimed in claim 1 in which said complex (C) is selected from the group consisting of [(CH₃)₃P]₄Pt, [(C₄H₉)₃P]₄Pt, [(C₆H₅)₃P]₄Pt, [(CH₃O)₃P]₄Pt, [(C₄H₉O)₃P]₄Pt, [(C₆H₅O)₃P]₄Pt, [(ClC₆H₄O)₃P]₄Pt, [(p-ClC₆H₄)₃P]₄Pt, [(p-Cl C₆H₄)₃P]₂-[(C₆H₅O)₃P]₂Pt, [(C₂H₅)₂(C₆H₅)P]₄Pt, [(C₂H₅O)₂(C₆H₅O)P]₄Pt, [(CH₃)₂(C₄H₉O)P]₄Pt, [(C₆H₅)₃P]₃Pt, and [(C₆H₅O)₃P]₃Pt.

4. A silicone rubber composition as claimed in claim 3 in which the amount of said complex (C) is from 0.001 to 0.1 parts by weight, per 100 parts of component (A).

5. A silicone rubber as claimed in claim 1 in which the amount of said filler component (D) is from 10 to 200 parts by weight.

6. A silicone rubber composition as claimed in claim 5 in which said alkyl groups of component (A) and the organo group of component (B) are methyl groups.

7. A silicone rubber composition as claimed in claim 5 in which said complex (C) is selected from the group consisting of [(CH₃)₃P]₄Pt, [(C₄H₉)₃P]₄Pt, [(C₆H₅)₃P]₄Pt, [(CH₃O)₃P]₄Pt, [(C₄H₉O)₃P]₄Pt, [(C₆H₅O)₃P]₄Pt, [(ClC₆H₄O)₃P]₄Pt, [(p-Cl C₆H₄)₃P]₄Pt, [(p-Cl C₆H₄)₃P]₂-[(C₆H₅O)₃P]₂Pt, [(C₂H₅)₂(C₆H₅)P]₄Pt, [(C₂H₅O)₂(C₆H₅O)P]₄Pt, [(CH₃)₂(C₄H₉O)P]₄Pt, [(C₆H₅)₃P]₃Pt, and [(C₆H₅O)₃P]₃Pt.

8. A silicone rubber composition as claimed in claim 5 in which the amount of said complex (C) is from 0.001 to 0.1 parts by weight, per 100 parts of component (A).

9. A process for preparing a cured silicone rubber which comprises curing the composition of claim 5 with steam at a pressure of from 2 to 20 kg/cm² and a temperature of from 130° to 210° C.

10. A silicone rubber composition as claimed in claim 1, in which n is from 1000 to 10000 on the average.

11. A silicone rubber composition as claimed in claim 5, in which n is from 1000 to 10000 on the average.

* * * * *